United States Patent
Calvert

(10) Patent No.: US 10,659,829 B2
(45) Date of Patent: *May 19, 2020

(54) SYNCHRONIZING THE STORING OF STREAMING VIDEO

(71) Applicant: AXIS AB, Lund (SE)

(72) Inventor: Kerry Calvert, San Diego, CA (US)

(73) Assignee: AXIS AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,144

(22) Filed: Oct. 27, 2017

(65) Prior Publication Data

US 2018/0063563 A1 Mar. 1, 2018

Related U.S. Application Data

(63) Continuation of application No. 14/512,174, filed on Oct. 10, 2014, now Pat. No. 9,832,498, which is a (Continued)

(51) Int. Cl.
*H04N 21/242* (2011.01)
*H04N 9/79* (2006.01)
(Continued)

(52) U.S. Cl.
CPC ....... *H04N 21/242* (2013.01); *H04L 65/4084* (2013.01); *H04L 65/80* (2013.01);
(Continued)

(58) Field of Classification Search
USPC ............... 386/239, 210, 224, 248, 351, 346; 348/143; 725/88; 709/231
See application file for complete search history.

(56) References Cited

U.S. PATENT DOCUMENTS

| | | |
|---|---|---|
| 5,953,073 A | 9/1999 | Kozina et al. |
| 6,535,226 B1 | 3/2003 | Sorokin et al. |

(Continued)

FOREIGN PATENT DOCUMENTS

| | | |
|---|---|---|
| JP | 2006203649 A | 8/2006 |
| KR | 100747080 B1 | 8/2007 |

(Continued)

*Primary Examiner* — Thai Q Tran
*Assistant Examiner* — Stephen R Smith
(74) *Attorney, Agent, or Firm* — Volpe and Koenig, P.C.

(57) ABSTRACT

A method, system, and computer-readable medium for synchronizing video are described. The system captures video data with a camera, the video data including a first video data segment and a second video data segment. When a network between the camera and a hub is insufficient to allow downstream real-time streaming of the video data, the system stores the first video data segment on a first storage. When the network is sufficient to allow downstream real-time streaming of the video data, the system transfers the second video data segment from the camera to the hub, reads the first video data segment from the first storage, and transfers the first video data segment to the hub. The system stores the video data segments onto a second storage such that a non-real-time playback from the second storage shows the first video data segment and the second video data segment in sequence.

13 Claims, 7 Drawing Sheets

Related U.S. Application Data continuation of application No. 13/911,212, filed on Jun. 6, 2013, now Pat. No. 8,863,208.

(60) Provisional application No. 61/680,259, filed on Aug. 6, 2012, provisional application No. 61/660,953, filed on Jun. 18, 2012.

(51) Int. Cl.

| | |
|---|---|
| *H04N 21/2187* | (2011.01) |
| *H04N 21/231* | (2011.01) |
| *H04N 21/262* | (2011.01) |
| *H04N 21/845* | (2011.01) |
| *H04N 21/643* | (2011.01) |
| *H04L 29/06* | (2006.01) |
| *H04N 5/765* | (2006.01) |
| *H04N 5/77* | (2006.01) |
| *H04N 7/18* | (2006.01) |
| *H04N 5/76* | (2006.01) |

(52) U.S. Cl.
CPC ............ *H04N 5/765* (2013.01); *H04N 5/772* (2013.01); *H04N 9/79* (2013.01); *H04N 21/2187* (2013.01); *H04N 21/23106* (2013.01); *H04N 21/26216* (2013.01); *H04N 21/64322* (2013.01); *H04N 21/8456* (2013.01); *H04N 5/76* (2013.01); *H04N 7/183* (2013.01)

(56) References Cited

U.S. PATENT DOCUMENTS

| | | | |
|---|---|---|---|
| 7,184,100 B1* | 2/2007 | Wilf | G11B 27/28 348/700 |
| 7,925,219 B2 | 4/2011 | Renkis | |
| 8,234,397 B2 | 7/2012 | Gupta | |
| 8,768,142 B1 | 7/2014 | Ju | |
| 8,805,431 B2* | 8/2014 | Vasavada | H04L 65/4061 455/518 |
| 8,863,208 B2 | 10/2014 | Calvert | |
| 8,970,654 B1 | 3/2015 | Johnson | |
| 2003/0202099 A1 | 10/2003 | Nakamura | |
| 2004/0075738 A1 | 4/2004 | Burke et al. | |
| 2004/0168204 A1 | 8/2004 | Choe | |
| 2005/0097213 A1* | 5/2005 | Barrett | H04N 7/17336 709/231 |
| 2005/0244070 A1 | 11/2005 | Itakura | |
| 2006/0161960 A1 | 7/2006 | Benoit | |
| 2006/0271695 A1 | 11/2006 | Lavian | |
| 2006/0274829 A1 | 12/2006 | Siemens et al. | |
| 2007/0266169 A1* | 11/2007 | Chen | H04L 65/4084 709/231 |
| 2008/0176539 A1 | 7/2008 | Staton et al. | |
| 2009/0189981 A1* | 7/2009 | Siann | H04N 7/183 348/143 |
| 2010/0030343 A1 | 12/2010 | Chang et al. | |
| 2011/0078750 A1* | 3/2011 | Tam | G11B 27/005 725/88 |
| 2012/0033876 A1* | 2/2012 | Momeyer | G06K 9/228 382/165 |
| 2012/0250762 A1 | 10/2012 | Kaye | |
| 2012/0281115 A1* | 11/2012 | Kouncar | H04N 21/440254 348/231.99 |
| 2013/0212233 A1 | 8/2013 | Landry | |
| 2014/0049636 A1 | 2/2014 | O'Donnell | |
| 2015/0030306 A1 | 1/2015 | Calvert | |
| 2015/0187389 A1 | 7/2015 | Horita | |

FOREIGN PATENT DOCUMENTS

| | | |
|---|---|---|
| KR | 100863126 B1 | 10/2008 |
| WO | 03036936 A1 | 5/2003 |

* cited by examiner

SYNCHRONIZING THE STORING OF STREAMING VIDEO

RELATED APPLICATIONS

This application claims priority to U.S. patent application Ser. No. 14/512,174 filed on Oct. 10, 2014 which claims priority to U.S. patent application Ser. No. 13/911,212, filed Jun. 6, 2013, entitled "Synchronizing the Storing of Streaming Video", which claimed the benefit of U.S. Provisional Patent Application No. 61/680,259 filed on Aug. 6, 2012, entitled "Method for Synchronizing the storing of streaming video", and U.S. Provisional Patent Application No. 61/660,953, filed on Jun. 18, 2012, entitled "Method for Synchronizing the storing of streaming video", all of which are hereby incorporated by reference in their entirety for all purposes.

BACKGROUND

Network camera systems can be based on Internet protocol (IP) and use Ethernet based networking technology. In some applications, network camera systems are replacing analog closed circuit television (CCTV) due to various factors, such as accessibility, ease-of-use, cabling scalability, and lower cost of deployment and operation. With the ubiquity of wireless networks such as WiFi networks (based on IEEE 802.11 standards) and the emerging WiMAX networks (based on IEEE 802.16 standards), wireless network camera systems are gaining popularity and may become the dominant platform for video surveillance applications.

In an IP surveillance environment, a network camera system can include IP cameras connected via twisted pair cabling to a network switch. Alternatively, the network connection can be achieved using wireless local area networking (LAN) technology standard. In various applications, IP cameras can include a web-server capability and remote clients or observers connected to the camera via standard TCP/IP interface standards such as FTP or HTTP.

Real-time streaming of video can also be an important function for a video surveillance environment. A remote viewer viewing the video may wish to have minimal delays in watching the captured video in order to be able to respond to a situation more clearly. Real-time streaming also has other applications. For example, sports enthusiasts often wish to watch a sporting event in real-time so as to enable up-to-date information regarding the event.

SUMMARY

The current disclosure describes a method, network camera system, and computer-readable medium for synchronizing storing of video. The method includes capturing video data with a camera. The video data includes a first video data segment and a second video data segment. When a network between the camera and a hub is insufficient to allow downstream real-time streaming of the video data, the first video data segment is stored on a first storage. When the network between the camera and the hub is sufficient to allow downstream real-time streaming of the video data, the method/system/medium (i) transfers the second video data segment from the camera to the hub over the network, (ii) reads the first video data segment from the first storage, and (iii) transfers the first video data segment to the hub over the network. The first video data segment and the second video data segment are stored on a second storage such that a non-real-time playback from the second storage shows the first video data segment and the second video data segment in sequence.

The present invention is better understood upon consideration of the detailed description below in conjunction with the accompanying drawings and claims.

DETAILED DESCRIPTION

Figure 1:
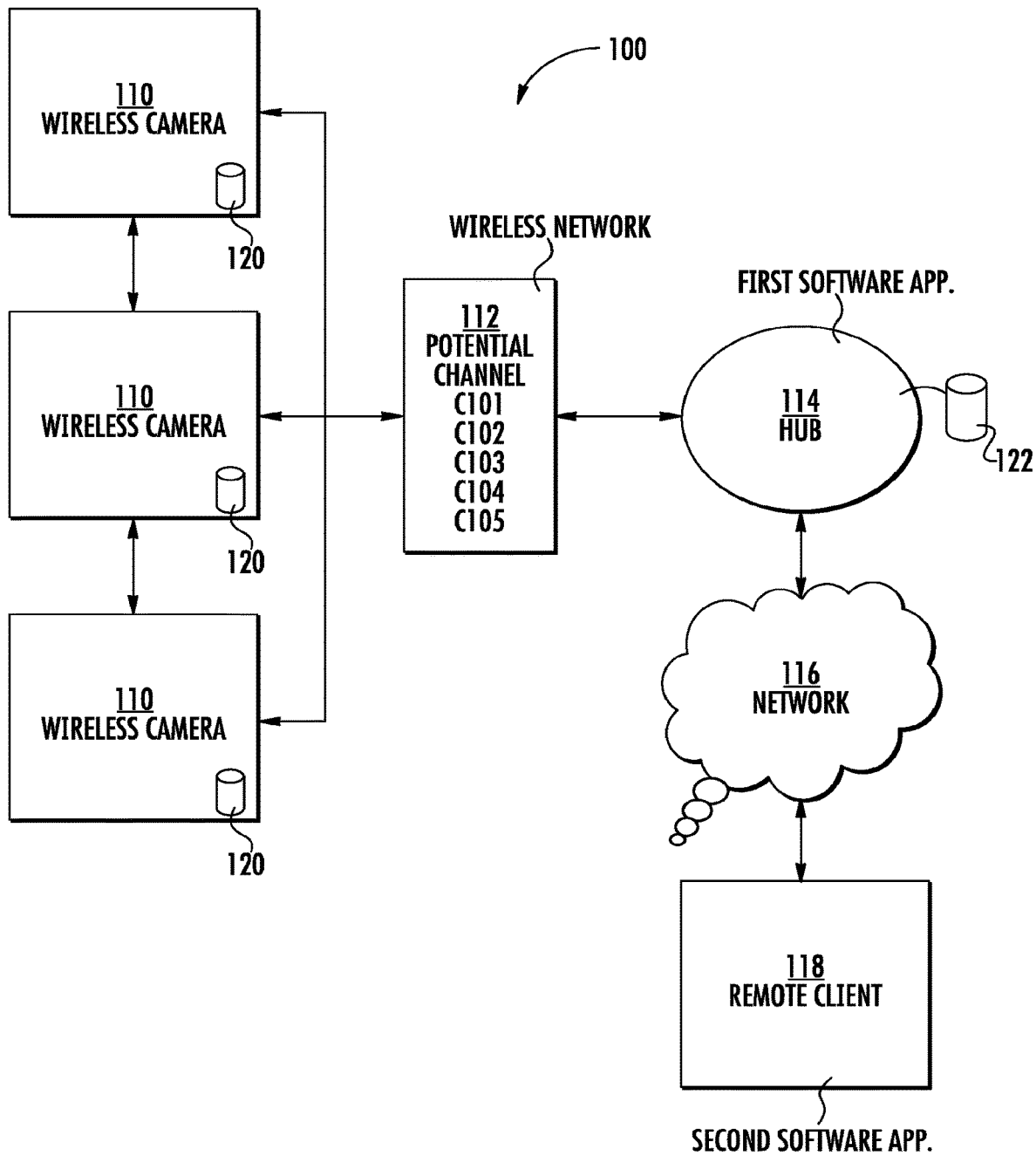
FIG. 1 is a functional diagram of an exemplary network camera system according to an embodiment.

The invention generally relates to network camera systems and storing captured video data. The current disclosure describes a method, network camera system, and computer-readable medium for synchronizing storing of video. The method includes capturing video data with a camera. The video data includes a first video data segment and a second video data segment. When a network between the camera and a hub is insufficient to allow downstream real-time streaming of the video data, the first video data segment is stored on a first storage. When the network between the camera and the hub is sufficient to allow downstream real-time streaming of the video data, the method/system/medium (i) transfers the second video data segment from the camera to the hub over the network, (ii) reads the first video data segment from the first storage, and (iii) transfers the first video data segment to the hub over the network. The first video data segment and the second video data segment are stored on a second storage such that a non-real-time playback from the second storage shows the first video data segment and the second video data segment in sequence. The storing may include constructing a hash table that catalogs and relates the video data segments to respective time segments.

The first video data segment may be transferred over the network on a first channel. The second video data segment may be transferred over the network on a second channel that is more time-sensitive than the first channel.

The method may further include displaying a copy of the second video data segment to a viewer in real time during the transferring of the second video data segment. The displaying may include transferring the copy of the second video data segment over a display network. The displaying may also include determining a bandwidth of the display network. Based on the bandwidth of the display network, the displaying may also include reducing a full resolution of the second video data segment to make the copy of the second video data segment that is displayed to the viewer.

When the network has sufficient bandwidth for real-time streaming of the video data, the hub may send control data to the camera requesting the steps of reading the first video data segment and transferring the first video data segment.

The method may further include creating a keyframe index during the storing. When a playback position is requested and the playback position does not exist in the second storage, the method may use the keyframe index to find a next decodable video data, the next decodable video data being stored in the second storage.

The network camera system includes a camera and a hub. The camera is configured to capture video data including a first video data segment and a second video data segment. The camera stores the first video data segment on a first storage when the network camera system is unable to provide for real-time streaming of the video data. When the network camera system is able to provide for real-time streaming of the video data, the camera transfers the second video data segment to a hub over the network, reads the first video data segment from the first storage, and transfers the first video data segment to the hub over the network. The hub is configured to store the first video data segment and the second video data segment onto a second storage. A non-real-time playback from the second storage shows the first video data segment and the second video data segment in sequence. The computer-readable medium stores instructions, which, when executed by a processor, causes a network camera system to execute the methods described herein.

Embodiments of the present invention provide for synchronizing the storing of streaming video from a camera, for example, a wireless camera. Although any communication network can be used to transmit data to and from the camera, wireless networks such as WiFi networks (based on IEEE 802.11 standards) and WiMAX networks (based on IEEE 802.16 standards) can realize additional benefits from embodiments for reasons discussed below. Therefore, although embodiments are described below in wireless environments, the skilled artisan will understand that embodiments can be applied to both wired and wireless communication networks.

When a wireless channel exhibits excessive data traffic or loss of signal, transmission of camera video data to a hub may be interrupted. In other situations, a wireless link between the camera and the hub may be interrupted due to movement of a portable camera or change in the environment where a camera is mounted. Attenuation, interference, and multipath are all factors which may lead to signal loss or corruption. Other factors may lead to a break in reliable video data transmission from the camera to the hub such that video data may not be transmitted in real-time. For example, a network between the camera and the hub may be shared by other nodes that compete with the camera and hub for bandwidth. In another example, devices supporting the network (such as a router, switch, hub, or firewall) may become overloaded or otherwise fail to process data at or above the speed at which the data is receive or expected to be transmitted. In these scenarios, the network may become insufficient for allowing real-time video streaming.

When an interruption occurs, a user watching the camera's video in real time will experience a gap or break in the viewed video. The gap or break may be shown as a frozen frame, a blank screen, a message communicating that transmission has been interrupted, or the like.

In response, software located in the hub, for example, can monitor the wireless channel between the camera and the hub to determine when it is restored. When that channel is again robust and able to support video data transmission, the software reads lost video data (from the time when communication was disrupted) from a storage device located on the camera (e.g., a flash memory) and saves it within the camera video data previously stored at the hub. It is stored in a manner such that when reviewed later, the displayed video is continuous and without interruption.

FIG. 1 is a functional diagram of an exemplary network camera system 100 according to an embodiment. The network camera system 100 may include a plurality of wireless cameras 110, a first software application, and a second software application. Although multiple wireless cameras 110 are shown, the system also supports a single video capture device. The wireless video cameras 110 are connected to a network 112 at a distance, for example, exceeding nine (9) meters. The wireless cameras 110 may optionally communicate with one another over the network 112. The network 112 can be a wireless network (e.g., a Bluetooth connection, a cellular network, a wireless Ethernet network, a WiFi network, or a WiMAX network) or a wired network (e.g., LAN/WAN network or POE network). The wireless cameras 110 may include a first mechanism to capture and transmit live video in real-time to the first and/or second software application, and a first video record/database 120 of previously captured video.

A hub 114 may be utilized to monitor data on a first wireless channel C101 between the hub 114 and the wireless cameras 110. The hub 114 may also monitor data on a second wireless channel C102-C105 between the hub 114 and the wireless cameras 110, using this second channel C102-C105 for command and control and for copying recorded data from the cameras 110. The cameras may be located physically away from the hub 110 up to any distance in which the cameras 110 can still access the network, or even beyond the maximum network access distance. The cameras 110 may be remotely mounted or portable, such as a wearable camera. In normal operation, the cameras 110 record video data which may be (i) stored on the cameras 110, for example in the first video record database 120, or stored proximally closer to the cameras, for example in an external storage device that can be connected to the cameras, and (ii) transmitted to the hub 114 where the video data is stored and is also made optionally available for viewing by a user in real-time.

The terms "real-time" and "real time" are used herein as understood in the art. For instance, the skilled artisan will recognize that real-time streaming does not require that the viewer receives and is able to view video data at the exact instant it is captured, but substantially instantly, taking into account the delays from transmission in physical media and space, processing, and other constraints of the system.

Embodiments may include a first software application and a second software application. The wireless video camera may be connected to a wireless network at a distance exceeding, for example, nine (9) meters. The first software application is in communication with the wireless camera and the second software application through the network(s). The wireless camera includes a first mechanism to capture and transmit live video in real-time to the first and/or second software application, and a first video record/database of video which is previously captured video, whose time duration is a function of the configured storage capability of the camera. The first software application also collects the recorded video from the camera according to a usage model for the end application. The end application will choose to manage the collection of the recorded video depending on wireless bandwidth which affects the ability to collect the information simultaneously with live video.

The first software application also contains a second mechanism that determines the integrity of the match between the first video record/database and the second video record/database such that the second video record/database is substantially the same as the first video record/database. The second software application is connected to the second video record/database and allows viewing of the live video in-real time as well as viewing of the second video record/database controlled by the first software application.

The first video record/database 120 is an example of a first storage. The first video record/database 120 can be a memory device such as a flash memory, hard disk, floppy disk, magnetic tape, or any other memory device or collection of memory devices that is/are connected to the camera. The first video record/database 120 may include a non-volatile secondary memory in order to persist data across power cycles of the camera, although volatile primary memory can also suffice. The first video record/database 120 is shown as part of each wireless camera 110 as an internal memory, but the first video record/database 120 can also include an attached external storage device, for example, a network attached storage (NAS), a remote database, a cloud storage, and/or a shared memory device connected to a data bus.

The first mechanism can also request data stored on the first video record/database 120 that may not have previously been successfully transmitted, for example, in a live stream. This video data is merged into the local copy of the camera video recording such that a playback from this recorded video is seamless in the time axis. Wireless cameras 110 transmit data over the wireless network 112 to a hub 114, which is optionally located in a base station, via a channel C101-C105. Although five channels are shown, the system may have more or less channels. The wireless cameras 110 may also be associated with multiple hubs or base stations. Optionally, the first and second software applications may be in a cloud/server located physically away from the wireless cameras 110 and the hub 114.

Depending on the camera's hardware and software capabilities, video can be captured, recorded, and/or transmitted at a resolution deemed acceptable for the system. For example, to conserve channel communications bandwidth, the video may be streamed at a lower resolution than what is recorded. Recorded data can be transmitted to the hub 114 on a back channel that is not as time sensitive as live video when the resolution is higher than the live stream. For example, the back channels C102-C105 may have lower priorities than the time-sensitive live video channel C101. The first and/or second software application may decide on the system's optimal configuration for live video mixed with the desire for higher resolution playback, utilizing the available channel bandwidth on the wireless network 112.

In this model, the cameras 110 can be configured to record at a desirable resolution the cameras can support, and the image resolution streamed may or may not be the same as the recorded resolution. The hub 114 can create a copy of the video, for example at a lower resolution, presented by the cameras 110, and can make decisions on when the hub 114 needs to request recorded video from the cameras 110 for integration into the copy of the video stream. This allows the system 100 to optimize video playback while retaining a recording in a desired resolution that can be used for playback.

The first software application may communicate with the wireless cameras 110 and the second software application through wireless networks 112, 116. In one embodiment, the first software application runs on hub 114. Hub 114 is configured to receive information from the wireless cameras 110 and has one or more potential communication channels over the network 112. In this example, the network 116 can be a display network that connects hub 114 with a remote client 118 through a wireless network (e.g., a Bluetooth connection, a cellular network, a wireless Ethernet network, a WiFi network, or a WiMAX network) or a wired network (e.g., LAN/WAN network or POE network).

Remote client 118 may be a device such as a mobile phone, personal digital assistant (PDA), smartphone, laptop, computer, or any other device that allows for viewing of the captured or recorded video. The second software application may run on remote client 118 to provide a user with access to the video.

In one embodiment, hub 114 processes the video data received from the wireless cameras 110. In another embodiment, hub 114 can be one or more devices, such as a group of computers receiving and processing the video data as a wireless base station. Hence, the computers may function as the base station or hub 114 as well as the remote client 118.

The first software application controls the transfer of the live video and portions of the first video record/database 120 to compile a second video record/database 122. The second video record/database 122 can be collocated with the hub 114 or may be remotely located, for example, in a separate database, server, or cloud.

Figure 2:
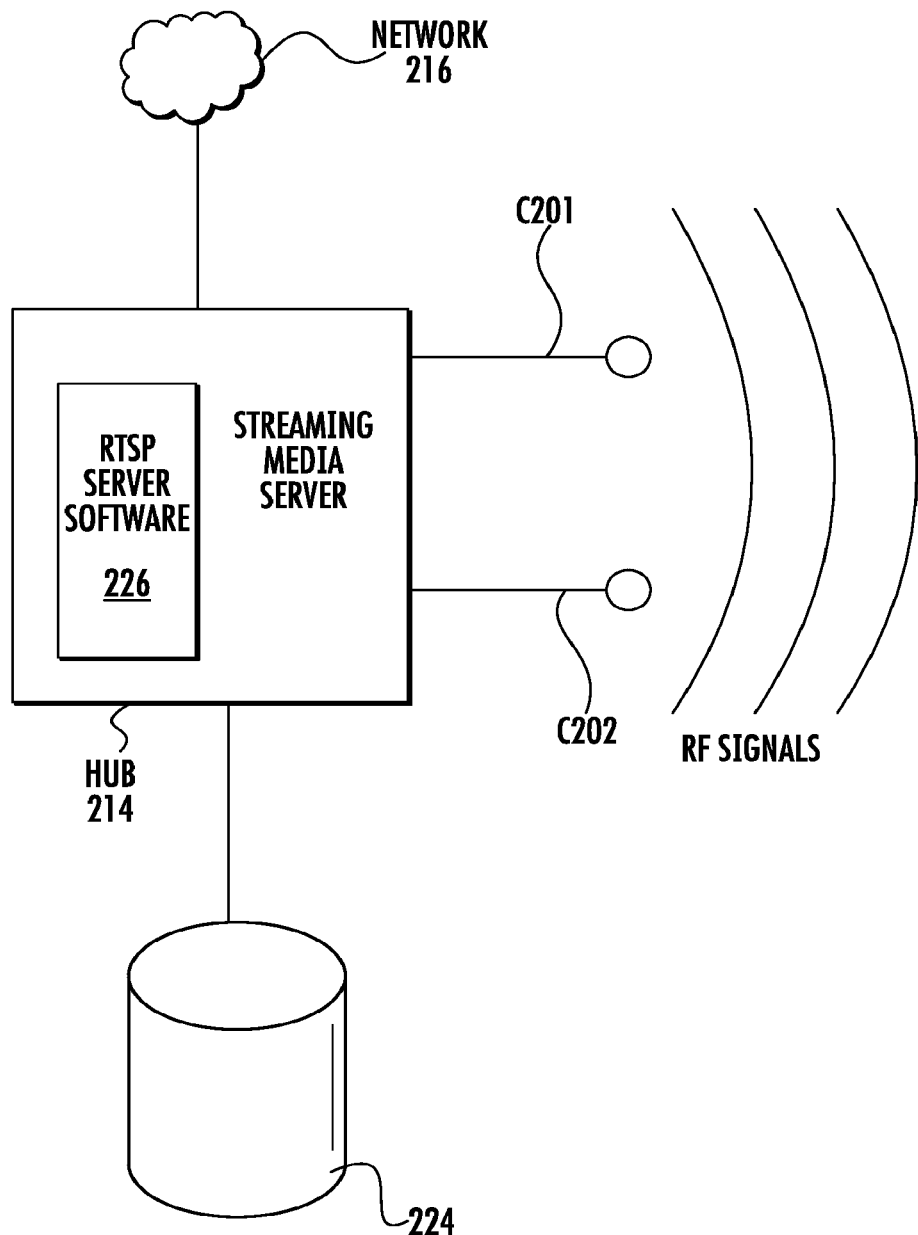
FIG. 2 is a functional diagram of an exemplary hub according to an embodiment.

FIG. 2 is a functional diagram of a hub 214 according to an embodiment. In this embodiment, the hub 214 receives information such as video data from a wireless camera (not shown in FIG. 2) over a transmission channel C201. The hub 214 transmits commands and controls to the wireless camera over a transmission channel C202, using, for example, RF signals. The hub 214 also has temporary memory storage hardware 224 used to cache the information received from the wireless camera over a network.

The hub 214 can use any network protocol that allows for streaming the video data from the wireless camera to the hub 214 to a remote client (not shown in FIG. 2). In one embodiment, the hub 214 uses Real Time Streaming Protocol (RTSP), a network control protocol designed for use in communications systems to control streaming media servers. The protocol is used to establish and control media sessions between end points such as the hub 214 and the remote client. RTSP server software 226 residing on the hub 214 receives and processes commands from the remote client. The remote client (controlled by a user or automated) may issue VCR-like commands, such as play, rewind, pause, and trick modes (fast forward, fast reverse, etc.) to facilitate real-time control of playback of video data from the hub 214. The remote client can access the hub 214 through a network 216 and can proxy the RTSP interface to an uplink over which information is accessed. Provisioning is made for media sessions to present the video stream in different resolutions, allowing the end application, the hub, or both to choose the resolution as desired or allowed by the system. Transcoding of stored video to a resolution selected by the RTSP session can be performed by the hub 214 (if stored in storage 224) or by the wireless cameras (if stored in a camera-side storage).

Figure 3:
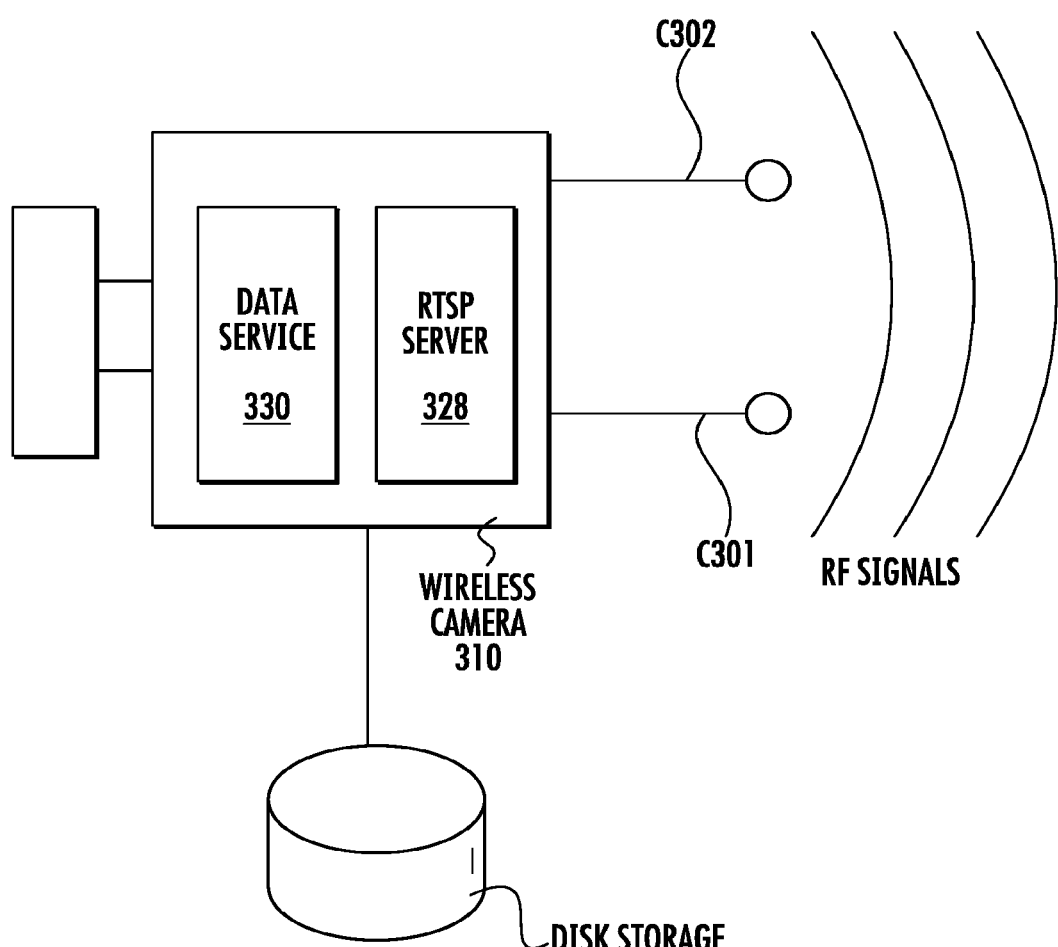
FIG. 3 is a functional diagram of an exemplary wireless camera according to an embodiment.

FIG. 3 is a functional diagram of an exemplary wireless camera 310 according to an embodiment. In this embodiment, a radio receiver (not shown in FIG. 3) of the wireless camera 310 receives command and control information from a hub (not shown in FIG. 3) over transmission channel C302, and a radio transmitter of the wireless camera 310 sends data corresponding to video captured by the wireless camera 310 to the hub over transmission channel C301, using, for example, RF signals. Temporary memory storage hardware 320 can be used to cache the information recorded for later retrieval. For example, when a wireless link between the hub and wireless camera 310 is interrupted or of poor quality or has insufficient bandwidth to support video streaming, the wireless camera 310 caches video data in the storage 320 until the wireless link can handle video streaming and requests or retrieves the cached video data from the storage 320. RTSP server software 328 implements the command/control requests for video, such as play, rewind, pause, and trick modes (e.g., fast forward, fast reverse, etc.). A data service 330 can retrieve video data from the storage 320 upon request and store video data into the storage 320 when the wireless link is down or otherwise unable to support streaming video.

Figure 4:
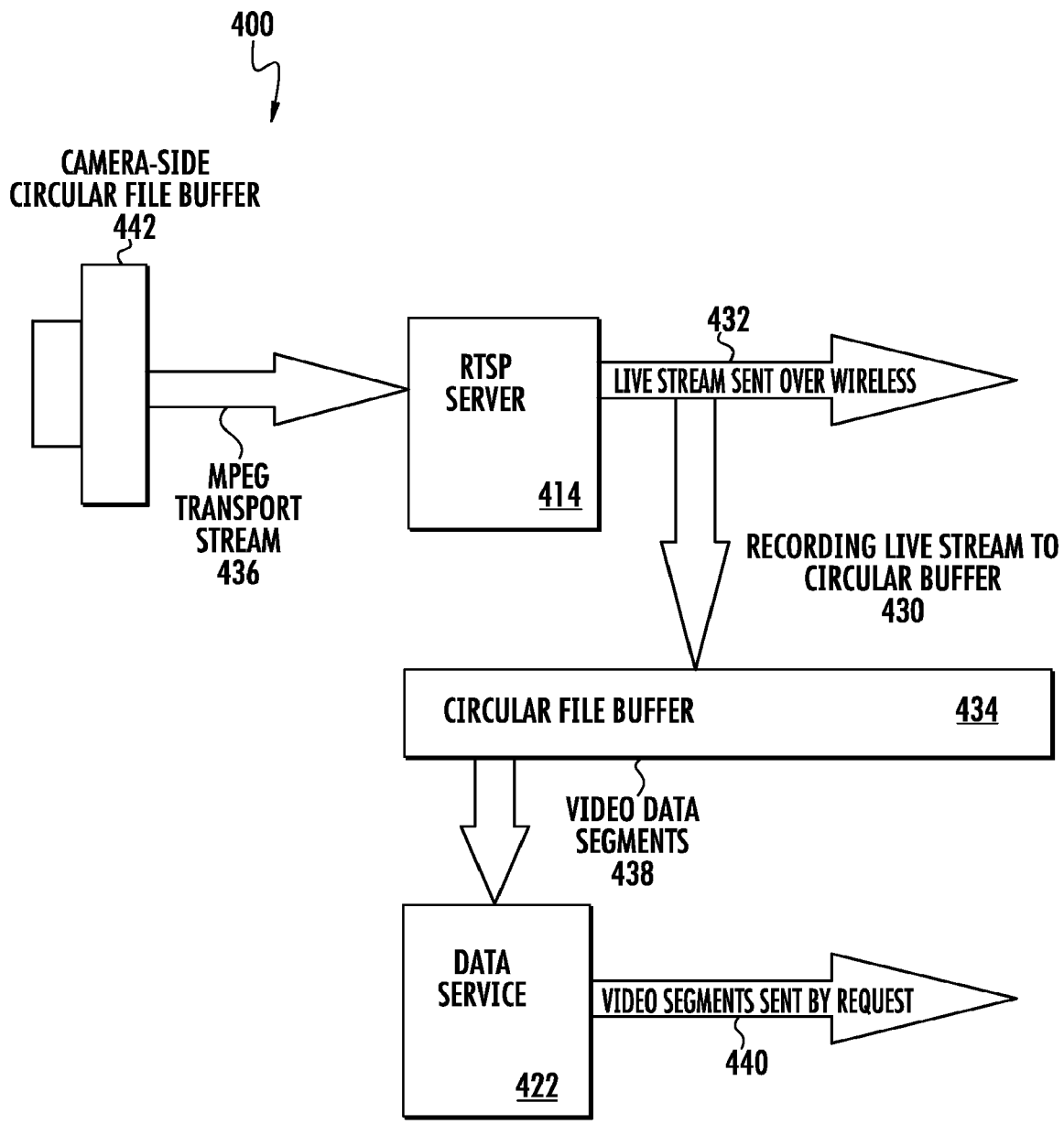
FIG. 4 is a process overview flowchart according to an embodiment.

FIG. 4 is a process overview flowchart 400 according to an embodiment. A hub can function as an RTSP server 414. RTSP provides the ability to present the video stream and the command and control of the video through an Application Programming Interface (API) that is ubiquitous in the art. An RTSP connection to the hub may be routed through a Control Unit Device (CUD) (not shown) and may be used to provide viewers with real time/interactive access to the video data. The CUD can also transfer the video from the hub to an archival server (not shown) via a data service.

The hub may monitor a wireless link (that enables, for example, an MPEG transport stream) to the wireless camera, receive video data from the wireless camera, and organize the video data as a time linear buffer of video based on timestamps attached to video data segments received from the wireless camera. The wireless link between the hub and the wireless camera may be interrupted for a variety of reasons such as excessive data traffic, changes in environmental factors, or the like. During such a condition, the video data segments received from the wireless camera may have gaps in the video in the time axis. The storage organization of the video data can account for this by constructing a hash table that catalogs and relates video data segments stored in memory to their respective time ranges for playback. When the wireless link is active or otherwise able to transmit a live stream again, the hub retrieves and/or the camera transmits the missing blocks of video data that have been cached on the camera to construct a complete set of video data segments that are stored in a location accessible by the hub for playback.

In one embodiment, the video data segments stored on the hub are temporal, and will be sent to the CUD for transmission to its archival system (not shown in FIG. 4) via the data service 422. For example, the hub can temporarily record the video data segments 430 (while they are being sent in a live stream over wireless 432) in a circular file buffer 434. The data service 422 can receive video data segments 438 from the circular file buffer 434 to send to the archival system. The data service 422 can also retrieve the video data segments from the archival system upon request 440. Once the video data segments are sent to the CUD, they are eventually removed from the hub to free up storage for new video data segments. This same storage management policy can exist between the wireless camera and the hub.

The wireless cameras can constantly record video in a circular buffer 442. When the wireless link to the hub is active and can support requested streaming video, the cameras stream the live video to the hub as well. Alternatively, to save memory write cycles, the cameras can be configured to not write the captured video data into the cameras' circular buffers when the data is successfully streamed. In this alternate configuration, the cameras store only the video data segments that were not successfully transmitted. The video data segments are transmitted as a Moving Picture Experts Group (MPEG) transport stream 436, so timestamps in the video data segments allow the hub to keep track of missing video. When the hub receives the MPEG transport stream, it monitors the Presentation Time Stamps (PTS) in the stream and uses these to determine which time segments are missing from the recording. In a pull scheme, the hub queries the wireless camera data service to retrieve the missing video in order to fill in the blanks in its video cache. Alternatively, the system can be configured in a push scheme in which the wireless camera transmits any cached video once it detects that the network supports transmission.

The system can have a mechanism for down-converting the video. For example, a viewer may request to watch video only in 360p although the cameras may be recording in 1080p. Alternatively, the system may automatically detect that the communication networks are unable to support live streams in the full resolution captured. In one embodiment, the wireless cameras down-convert the video quality before they are transmitted to the hub. This allows the system to operate and deliver lower-resolution live streams when the communication network between the cameras and the hub are unable to support full resolution, and then the system can later deliver the full resolution video for later playback. However, this requires additional processing by the camera and thus may not be ideal for cameras with portable power supplies. Thus, as one alternative, the system may have one or more processing devices external to the cameras, but attached to the first video record/database: a camera-side processor. The camera-side processor is responsible for down-converting the video data segments prior to being lodged into the MPEG transport stream for real-time streaming. As another alternative, the cameras may transmit the full resolution to the hub; the hub is then responsible for down-converting the received video prior to live-streaming the video to the requesting viewer(s).

The hub can synchronize the storing of the video to create a seamless video playback experience. The first software application can include a second mechanism that determines the integrity of the match between the first video record/database and the second video record/database such that the second video record/database is substantially the same as (or, if there are multiple cameras, a sum of) the first video record/database(s). This may optionally be used for evidentiary or legal purposes. When the wireless link between the wireless camera and the hub is interrupted, gaps in the video exist in the hub's copy of the recording from the time the wireless link was interrupted until the time the wireless link is re-established, and the hub is again receiving the live stream from the wireless camera. The hub can manage two processing aspects when this condition exists. First, the hub contacts the wireless camera data service and requests the video blocks for the time range over which gaps exist. Second, as the hub's RTSP server is feeding video to remote clients and the playback position comes to a gap, the RTSP server uses a keyframe index to find the next decodable location in the data that has been stored which can be sent to a video player for seamless decoding. The keyframe index is created by the hub as it records the video on the memory.

As an alternative to the first processing aspect of the hub, the wireless cameras can detect which video data segments were and were not successfully transmitted to the hub (for example, the wireless cameras may receive TCP ACKs)—in this situation, the wireless cameras can be configured to send the segments that were not successfully transmitted to the hub, without having to await a request from the hub.

The keyframe index is also used to support trick mode playback. In order to playback the video at higher speeds, the RTSP server must skip frames that it sends to the video player. It does this by using the keyframe index to know where to seek to in the video data buffer, and then selecting the amount of data necessary for a decoder to completely resolve a video frame for playback. By skipping over frames and inter-frame data, the video illusion of fast motion playback is created when these frames are rendered on the screen for the user.

In one embodiment, the second software application or remote client, is connected to the second video record/database and allows viewing of the live video in-real time as well as viewing of the second video record/database controlled by the first software application.

Figure 5:
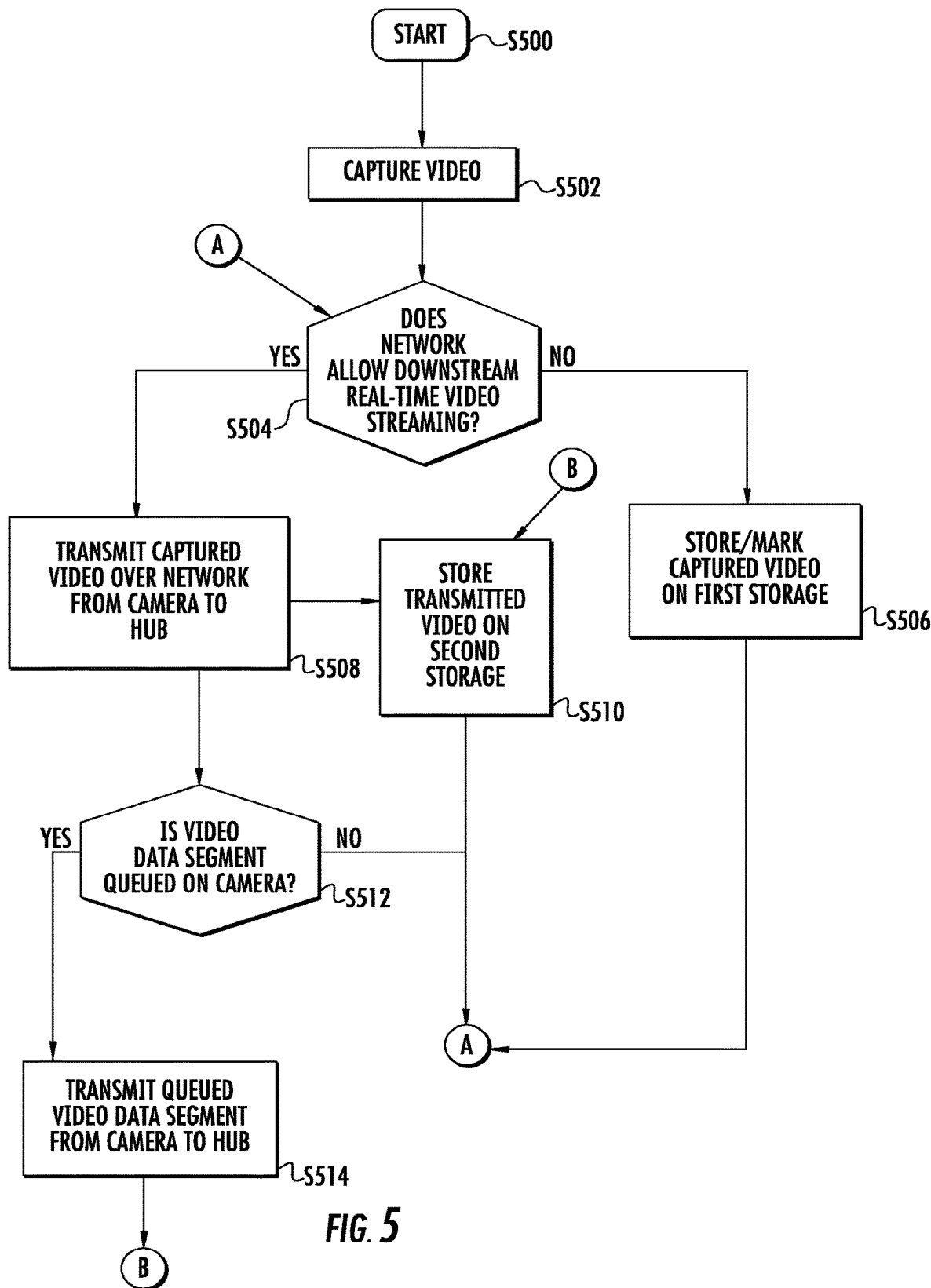
FIG. 5 is a flow diagram of an exemplary storage method according to an embodiment.

FIG. 5 is a flow diagram of an exemplary storage method according to an embodiment. After the system starts at 500, the wireless cameras continuously capture video at 502 during the entire method. The system (either the hub, the wireless cameras, or another mechanism of the system) determines whether the network allows downstream real-time video streaming at S504. If so, the cameras transmit captured video over the network from the cameras to the hub at S508 for real-time streaming and the hub stores the received video on the second video record/database storage at S510. Then, the cameras determine if there are video data segments queued on the camera (or, as described above, if video data segments stored on the camera have not been successfully transmitted) at S512. If so, the cameras transmit queued video data segments from the camera to the hub at S514 and the hub proceeds to store the transmitted video on the second video record/database storage at S510. After the real-time and back-queued video data segments are stored by the hub on the second storage at S510, the system again makes a determination as to whether the network allows downstream real-time video streaming at S504.

If the network does not allow downstream real-time video streaming at S504, then the wireless cameras can store the captured video on the first video record/database storage at S506. Alternatively, as described above, if the cameras are already configured to store video data segments irrespective of whether the video data segments are successfully received by the hub, then the cameras may instead mark the unsuccessfully transmitted video data segments so as to later transmit them (e.g., at S514). After either storing or marking the captured video on the first video record/database at S506, the system continues to make a determination as to whether the network allows downstream real-time video streaming at S504.

Figure 6:
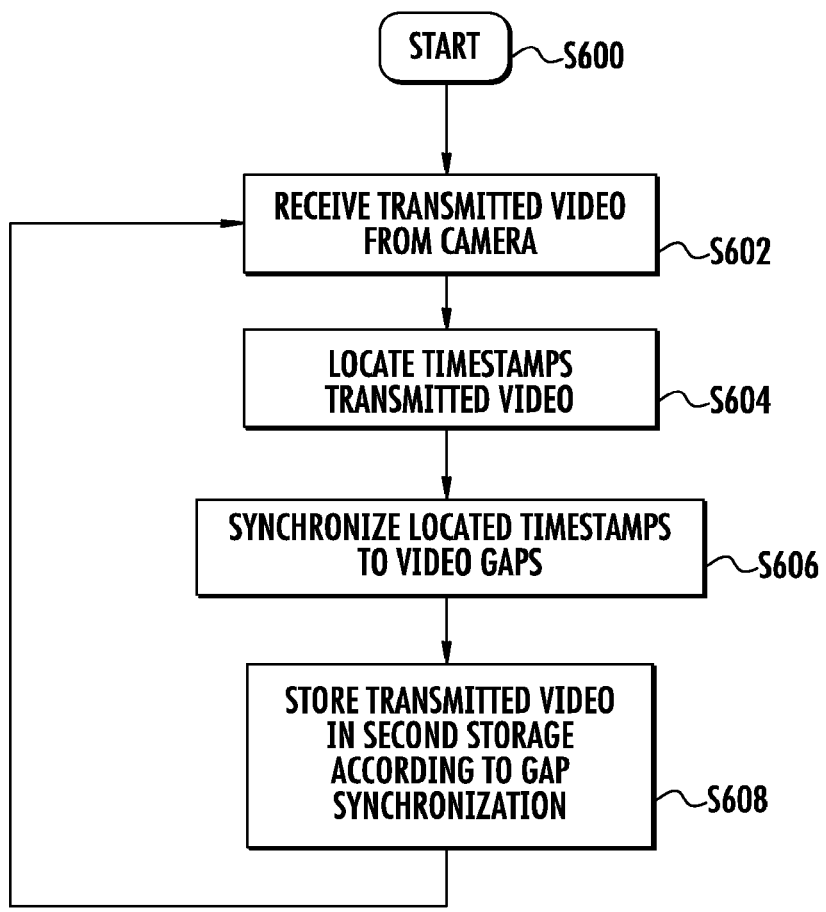
FIG. 6 is a flow diagram of an exemplary method of synchronizing the storing according to an embodiment.

FIG. 6 is a flow diagram of an exemplary method of synchronizing storing according to an embodiment. The method illustrated in FIG. 6 can provide more details for step S510 in FIG. 5, and can be considered an example of some functional aspects of the first software application. The method can be performed by the hub. As the method starts at S600, the hub receives transmitted video from the cameras at S602. The hub then locates the timestamps in the transmitted video at S604. Based on the timestamps in the video, the hub may determine whether the transmitted video data segments should be synchronized to gaps in the video data at S606. The hub then stores the transmitted video data segments in the second video record/database storage according to the gap synchronization at S608. Here, the hub can also determine that the transmitted video data segments do not correspond to gaps in the video data and the video data segments are instead appended to the video data stored in the second video record database. In either case, the transmitted video data segments are stored in the second video record/database storage such that a subsequent playback from the second storage shows the video data segments in sequence. After the transmitted video is stored, the cycle repeats.

Figure 7:
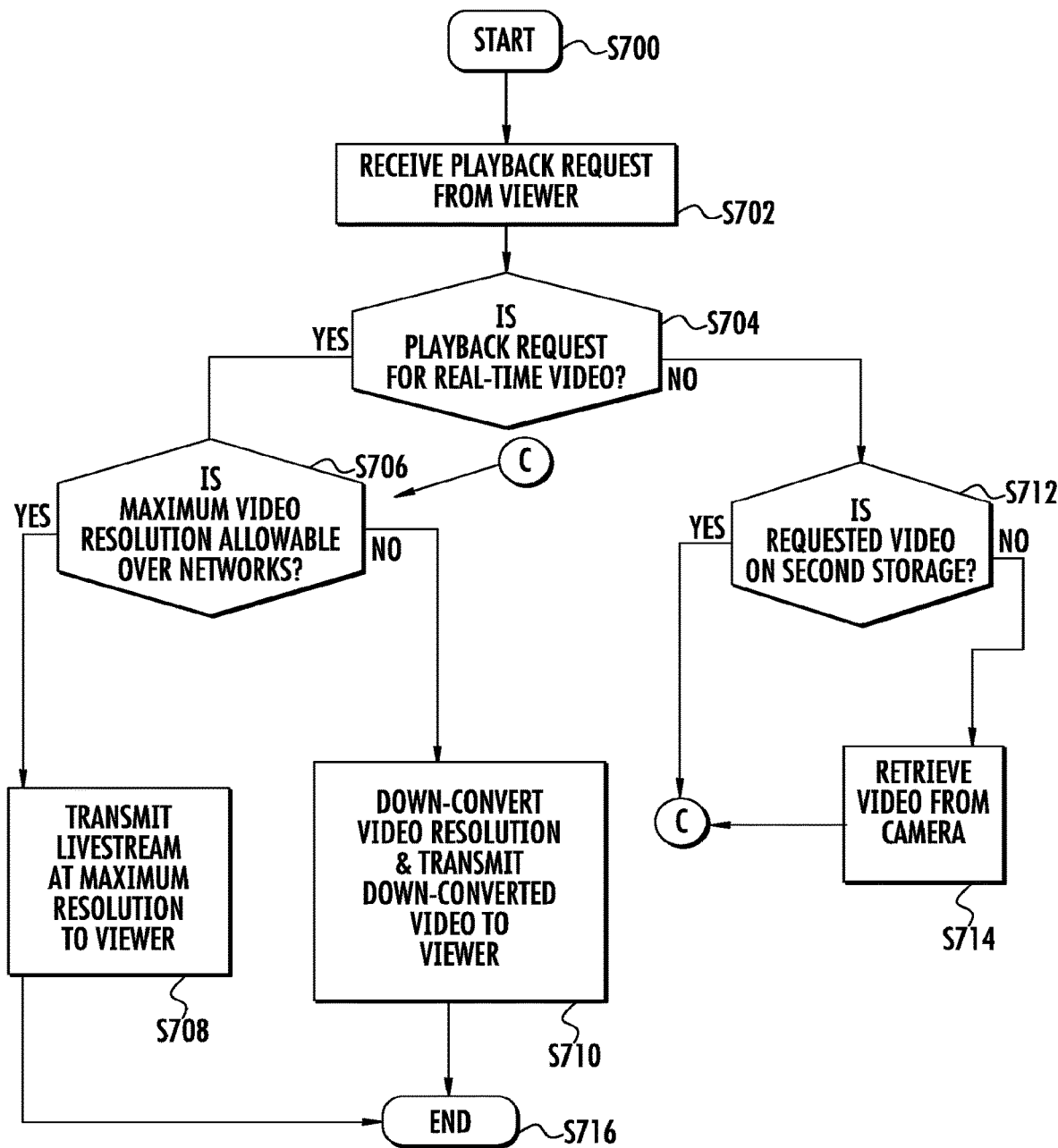
FIG. 7 is a flow diagram of an exemplary method of playback according to an embodiment.

FIG. 7 is a flow diagram of an exemplary method of playback according to an embodiment. The method can be considered an example of some functional aspects of the second software application. As the method starts at S700, the system (for example, the RTSP server on the hub) receives a playback request from the viewer at S702. The RTSP server determines whether the playback request is for real-time video, for example, by inspecting a flag in the request or by comparing the requested target time with the current video timestamps at S704. If the request is for real-time video, the system determines whether the maximum (or requested) video resolution is supported over the networks at S706. These networks include both the network between the cameras and the hub and the network between the RTSP server and the viewer. If the networks support the maximum (or requested) video resolution, then the system transmits a live stream at maximum (or requested) video resolution to the viewer at S708, according to above-described methods. If the networks do not support the maximum (or requested) video resolution, then the system down-converts the video resolution to a resolution supported by the networks and transmits the down-converted video to the viewer at S710, according to above-described methods.

If the playback request is not for real-time video at S704, then the hub determines whether the requested video is on the second video record/database storage at S712. If so, then the method proceeds to step S706. If not, then the hub can retrieve the cached or queued video from the cameras at S714 and then proceed to step S706.

In a non-limiting exemplary use case, a law enforcement agent, such as a first police officer, wears a portable, wireless camera. The first officer makes a routine traffic stop and starts recording video via the portable, wireless camera. The camera transmits its video to a hub device which is located in the first officer's squad car. The hub receives video collected from the first officer's portable, wireless camera and transmits the video to a CUD that connects to a wireless communication uplink. The communication uplink transfers the video data stream to the police station where a second officer views the live video stream in real-time. The CUD in the squad car acts as a router between the hub in the squad car and the police station. The RTSP connection to the hub is routed through the CUD and is used to provide users with real time/interactive access to the video.

Unfortunately, transmission of the camera's video data to the hub becomes interrupted and the second officer viewing the live video stream experiences a frozen frame for, for example, 30 seconds. After 30 seconds, the second officer experiences live video stream again. When the routine traffic stop concludes by the first officer, the second officer recalls the stored video from the routine traffic stop. This time when the second officer views the event, there is no frozen frame or gap or break in the video stream, and the entire event is available for viewing.

During the routine traffic stop, the camera recorded live video data, or first video record/database of video, stored the video data in a storage device located within and transmitted the video data to the hub. When the interruption of transmitting this video data to the hub occurred for 30 seconds, software or the first software application, located in the hub of the officer's squad car monitored the wireless channel between the camera and the hub to determine when it was restored. When that channel was again robust and able to support video data transmission, the software read lost video data (during the time when communication was disrupted) from the storage device located on the camera and saved it within the camera video previously stored at the hub. The video data was then stored in a manner such that when reviewed later, the camera video data was continuous and without interruption, thus the second video record/database of video.

Initially, the second officer and/or the remote client, via the second software application, is able to view the live video data in real-time or the first video record/database of video, both of which may contain gaps or breaks in the video stream. At a later time, the second officer and/or the remote client, via the second software application, is able to view the entire event or second video record/database of video without gaps or breaks. This entire event/second video record/database of video is controlled by the first software application. In one embodiment, the second officer/remote client may watch either the live video/first video or the entire event/second video after the entire event/second video becomes available. In another embodiment, the second officer/remove client may only watch the entire event/second video after it becomes available.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the invention. Thus, it is intended that the present subject matter covers such modifications and variations.

What is claimed is:

1. A method for synchronizing video in a wireless hub device, the method comprising:
   receiving timestamped first video data from a wearable camera via a first wireless connection, wherein the first video data is organized using a hash table;
   storing the first video data in a storage;
   live streaming the first video data to a remote client via a second wireless connection;
   detecting an interruption in the first wireless connection;
   generating an indication of video data not received from the wearable camera as a result of the interruption;
   after a resumption in the first wireless connection, receiving timestamped second video data corresponding to the video data not received from the wearable camera as a result of the interruption, wherein the second video data is organized using the hash table;
   storing the second video data in the storage according to gap synchronization based on one or more timestamps of the first video data and one or more timestamps of the second video data; and
   live streaming the second video data to the remote client via the second wireless connection after the resumption in the first wireless connection.

2. The method of claim 1, wherein receiving the second video data comprises:
   responsive to the resumption of the first wireless connection, requesting video blocks indicated by the indication of the video data not received, from the wearable camera.

3. The method of claim 1, wherein receiving the second video data comprises:
   receiving the second video data without requesting the second video data from the wearable camera.

4. The method of claim 1, wherein:
   the second video data is transferred from the wearable camera over a third wireless connection, the first wireless connection being more time-sensitive than the third wireless connection.

5. The method of claim 1, further comprising:
   prior to the resumption in the first wireless connection, transmitting the first video data to the remote client for playback using a keyframe index.

6. The method of claim 5, further comprising:
   causing playback of video at a fast rate by skipping frames based on the keyframe index.

7. A system for synchronizing video, the system comprising:
   a wireless hub device, including a streaming media server and a storage,
   wherein the streaming media server is configured to:
      receive timestamped first video data from a wearable camera via a first wireless connection, wherein the first video data is organized using a hash table;
      live stream the first video data to a remote client via a second wireless connection;
      detect an interruption in the first wireless connection;
      generate an indication of video data not received from the wearable camera as a result of the interruption;
      after a resumption in the first wireless connection, receive timestamped second video data corresponding to the video data not received from the wearable camera as a result of the interruption, wherein the second video data is organized using the hash table; and
      live stream the second data to the remote client via the second wireless connection after the resumption in the first wireless connection, and
   wherein the storage is configured to store the first video data and the second video data according to gap synchronization based on one or more timestamps of the first video data and one or more timestamps of the second video data.

8. The system of claim 7, wherein the streaming media server is configured to receive the second video data by:
   responsive to the resumption of the first wireless connection, requesting video blocks indicated by the indication of the video data not received, from the wearable camera.

9. The system of claim 7, wherein the streaming media server is configured to receive the second video data by:
   receiving the second video data without requesting the second video data from the wearable camera.

10. The system of claim 7 further comprising:
    the camera, configured to:
    detect that the first wireless connection has become unable to support full resolution video playback; and
    responsive to the detection, down-convert video data and transmit the down-converted video data to the wireless hub device via the first wireless connection.

11. The system of claim 7, wherein:
    the second video data is transferred from the wearable camera over a third wireless connection, the first wireless connection being more time-sensitive than the third wireless connection.

12. The system of claim 7, wherein the streaming media server is further configured to:

prior to the resumption in the first wireless connection, transmitting the first video data to the remote client for playback using a keyframe index.

13. The system of claim 12, wherein the streaming media server is further configured to:

cause playback of video at a fast rate by skipping frames based on the keyframe index.

* * * * *